United States Patent [19]
Fennessy

[11] B 3,981,685
[45] Sept. 21, 1976

[54] MONOLITHIC CATALYTIC CONVERTER HAVING FLUIDIZED ABRASIVE PARTICLES BED FOR MAINTAINING CATALYST ACTIVITY

[75] Inventor: Francis J. Fennessy, East Hartford, Conn.

[73] Assignee: United Technologies Corporation, Hartford, Conn.

[22] Filed: Apr. 4, 1975

[21] Appl. No.: 565,180

[44] Published under the second Trial Voluntary Protest Program on January 27, 1976 as document No. B 565,180.

Related U.S. Application Data

[63] Continuation-in-part of Ser. No. 427,872, Dec. 26, 1973, abandoned.

[52] U.S. Cl. .................. 23/288 F; 23/288 R; 23/288 FC; 60/299
[51] Int. Cl.² .................. B01J 8/18; B01J 8/24; F01N 3/15; F01N 5/04
[58] Field of Search ...... 23/288 F, 288 FB, 288 FC, 23/288 B, 288 R, 288 S; 60/299

[56] References Cited
UNITED STATES PATENTS

| | | |
|---|---|---|
| 2,222,884 | 11/1940 | Stowe............................. 23/288 R |
| 2,747,976 | 5/1956 | Houdry........................... 23/288 F |
| 2,772,147 | 11/1956 | Bowen et al..................... 23/288 F |
| 2,880,079 | 3/1959 | Cornelius ....................... 23/288 F |
| 3,110,300 | 11/1963 | Brown et al..................... 23/288 F |
| 3,184,291 | 5/1965 | Calvert........................... 23/288 F |
| 3,186,804 | 6/1965 | Fisher............................. 23/288 F |
| 3,307,920 | 3/1967 | Barnes............................ 23/288 F |
| 3,740,925 | 6/1973 | Gothard.......................... 23/288 R |
| 3,754,870 | 8/1973 | Carnahan et al................ 23/288 F |

Primary Examiner—Barry S. Richman
Assistant Examiner—Bradley R. Garris
Attorney, Agent, or Firm—Charles A. Warren

[57] ABSTRACT

The exhaust gases from an internal combustion engine pass through a chamber which has a bed of abrasive particles in the bottom. These particles are carried across catalyst surfaces located above the bed when the exhaust gases are blown through the bed thereby reactivating the catalyzed surfaces during the operation of the engine. The abrasive particles drop back into the bed during use so that the operation is comparable to a fluidized bed. Clearance is provided between the surface of the bed of particles and the base of the catalyzed surfaces that permits a free access to the catalyzed surfaces by the particles and a return of the particles to the bed without interfering with the flow of the exhaust gases over the catalyzed surfaces.

4 Claims, 1 Drawing Figure

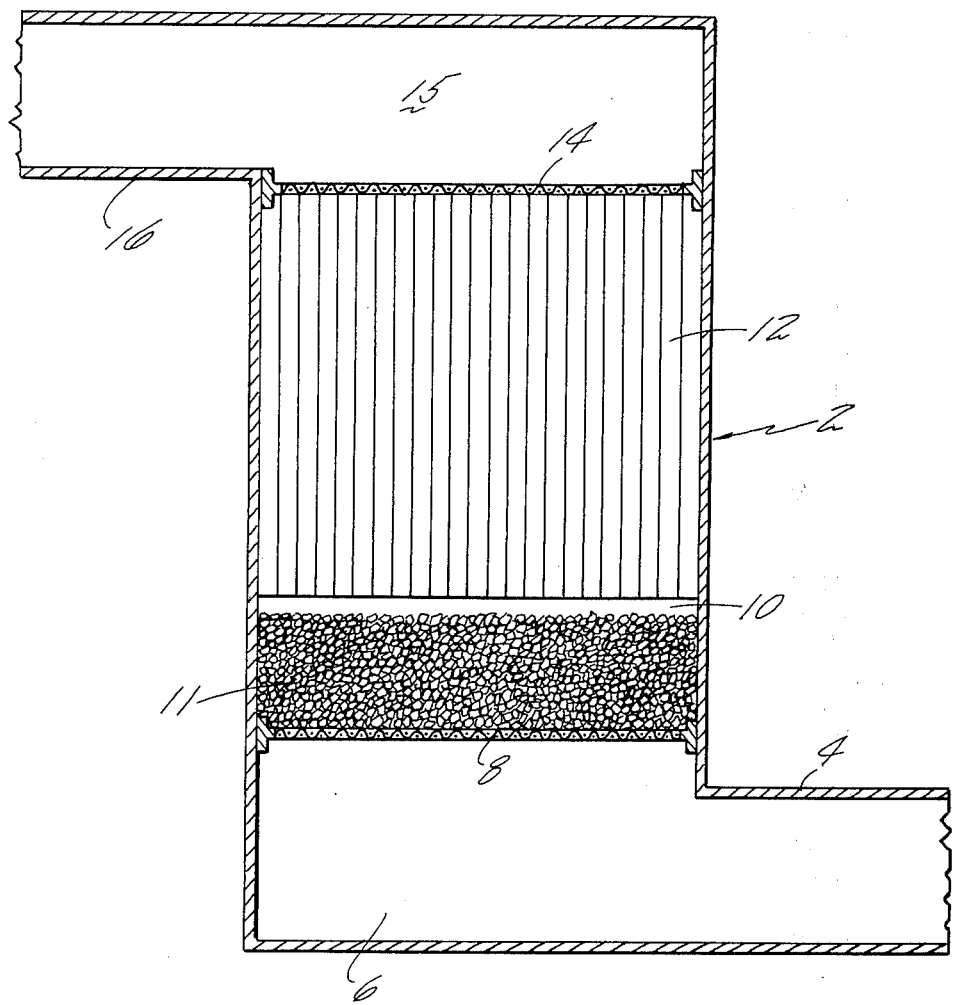

MONOLITHIC CATALYTIC CONVERTER HAVING FLUIDIZED ABRASIVE PARTICLES BED FOR MAINTAINING CATALYST ACTIVITY

This is a continuation-in-part of application Ser. No. 427,872, filed Dec. 26, 1973, now abandoned.

BACKGROUND OF THE INVENTION

This invention relates to the reactivation of the catalytic surfaces in a pollution prevention device especially for the exhaust from automotive vehicles. The generally known catalytic surfaces or particles used for the conversion of the exhaust gases to the nonpolluting gases, or for the removal of pollutants, become inactive in a relatively short time by the flow of exhaust fumes over the surfaces so that the anti-pollutant device becomes ineffective after a short period of use unless the catalytic material can be reactivated. This problem is particularly critical in automotive vehicles where adequate inspection to assure proper operation of the device is nonexistent.

SUMMARY OF THE INVENTION

One feature of the invention is an arrangement by which to reactivate continuously the catalyst whenever the device is in operation. More specifically the device incorporates a fluidized bed so arranged that the catalyst surfaces are continually being scrubbed while the device is operating.

A more specific feature is the use of catalytic platinum on the surfaces over which the exhaust fumes pass when exhausting from the engine with a fluidized bed so arranged that sand or other suitable, perhaps less harsh, abrasive particles not reacting with the exhaust gases are passed over the catalytic surfaces during engine operation.

According to the invention, the exhaust system for an automotive or other internal combustion engine incorporates a honeycomb or similar device through which the exhaust fumes pass with the device carrying a surface coating of a suitable catalyst for the removal of polluting substances in the exhaust fumes and in which abrasive particles are carried over the catalyst surfaces during engine operation by the flow of exhaust gases. This may be accomplished by combining a fluidized bed of abrasive particles with a honeycomb device and using the exhaust gases to fluidize the bed.

The foregoing and other objects, features and advantages of the present invention will become more apparent in the light of the following detailed description of preferred embodiments thereof as illustrated in the accompanying drawing.

BRIEF DESCRIPTION OF THE DRAWING

The single FIGURE is a diagrammatic sectional view of a pollution prevention device embodying the invention.

DESCRIPTION OF PREFERRED EMBODIMENTS

Referring to the drawing the device 2 has an inlet 4 at the bottom for attachment to the exhaust pipe or manifold of an automotive or other internal combustion engine. This inlet 4 is located adjacent to the bottom of the device as shown and directs the exhaust fumes from the engine into a chamber 6 in the bottom of the device below a screen 8.

Above the screen is a second chamber 10 filled with sand or other suitable abrasive particles 11, for example $Al_2O_3$ particles. The abrasive particles must be such as not to destroy the catalyst. The screen is a suitable fine mesh screen that will permit the flow of exhaust fumes evenly so that the flow is substantially uniform over the entire area of the screen. This screen is also small enough to retain the particles on the screen. One form of such screen may be the material commercially available as Rigimesh.

Arranged directly above the particles in the chamber 10 is a catalyst supporting device 12 presenting a large vertical surface area for the flow of the exhaust fumes over this surface area. For example the device 12 may be a honeycomb structure made of metal to resist the temperatures and corrosive ingredients in the exhaust fumes. The honeycomb surfaces are vertical and are coated with a suitable catalyst either to convert the pollutants in the exhaust fumes to nonpollutants as for example to convert the CO to $CO_2$ or to remove the pollutants from the fumes. One of the catalysts generally used is activated platinum, the application for this purpose being well known.

At the top of the catalyst device is another screen 14 of a mesh fine enough to prevent the loss of the abrasive particles from the chamber 10 for which the screen 14 forms a top. Above screen 14 is a third chamber 15 communicating with an outlet 16. In an automobile engine the outlet 16 connects with the vehicle tail pipe, not shown.

The abrasive particles do not fill the chamber 10 but, as shown, leave a clearance space 18 that may be as much as one fifth of the vertical dimension of the chamber. This clearance is adequate to permit the entry of the abrasive particles into the vertical passages in the catalyst support without clogging any of the spaces and to make sure that the abrasive material is not compacted in the chamber. This clearance also permits the return of the particles that have been carried up over the catalytic surfaces to return to the bed of particles without again compacting in any of the vertical passages. This arrangement permits the bed of abrasive particles to be fluidized more readily as will be apparent.

The arrangement is such that the bed will be functionable during normal driving conditions. Thus, the area of the bed is proportioned to the exhaust gas flow so that the particles will be carried over the catalyzed surfaces only enough to reactivate the bed. Thus, if the abrasive action is too rapid, the type of particles or the bed area may be larger to reduce the abrasive action. It may also be desirable to proportion the bed area so that the abrasive action occurs desirably only at normal high speed operation of the engine for which the unit is designed. Obviously, excessive abrasive action may be detrimental to the catalyst but adequate abrasive action is needed to maintain the activity of the catalyst.

For example, if the device is used on a motor vehicle for highway use, it may be adequate to have the bed become fluidized only with the exhaust flow at speeds above a predetermined amount, as for example at sixty miles per hour or more. Thus, the bed would be active during only a small part of the engine operation. This could be accomplished by sizing the area of the bed to the exhaust flow. Obviously, an increase in the bed area will raise the vehicle speed at which the bed is most fluidized. A reference to the area of the bed also presumes a proportioning of the flow area through the catalyst in the same manner.

In operation, the exhaust fumes enter the chamber 6 and pass up through the screen 8 flowing over the vertical surfaces of the honeycomb so that the pollutant therein may be eliminated by the catalyst on the surfaces of the honeycomb. The exhaust gases are then discharged through the outlet 16 into the tail pipe. As the exhaust gases flow upward through the abrasive particles some of them are picked up and carried over the surfaces of the catalytic coating thereby reactivating the catalyst and further removing any particles that may have settled on the catalyst thereby assuring a maximum catalyst exposure at all times. The bed of abrasive particles acts as a fluidized bed as the exhaust fumes flow through it, such fumes being the fluidizing gas. Thus, new particles of abrasive are continually being picked up and carried over the catalyst surfaces as other particles are returned by gravity to the bed of particles.

As above stated, if the device is dimensioned for this purpose, the bed will become fluidized in such a manner that the abrasive particles are carried to the top of the catalyst surfaces only at or near the maximum speed of the engine, this representing generally maximum exhaust discharge. When and if the catalyst is not reactivated adequately, a greater abrasive action over a wider range of operation can be obtained by using a similar device of slightly smaller size.

The top screen 14 prevents loss of the abrasive particles into the tail pipe in the event of rapid acceleration or a backfire and thus assure an adequate supply of abrasive for the life of the device. By suitable adjustment of the respective heights or depths of the abrasive bed, the area of the bed and the height of the clearance space, the catalyzing device will assure a movement of abrasive particles to the top of the device at times of maximum engine output without excessive accumulation of the particles against the top screen. The device will be mounted in a vertical position to assure the optimum performance of the fluidized bed with adequate cleaning action on the catalytic surfaces.

Although the term "screen" has been used above it will be understood that other suitable porous structures may be used equally effectively such as a sheet of porous material made for example by well-known powder metallurgy. Further, the catalytic device or structure 12, described and shown as a coated honeycomb element may be any other suitably openwork structure through which the exhaust fumes may pass with adequate contact with the catalytic surfaces to assure elimination of the pollutants without affecting the adequate movement of the abrasive particles. Thus, for example, a plurality of spaced flat sheets of material coated with the catalyst could serve the desired function if positioned with the catalyzed surfaces substantially vertical. Essentially, the catalyzed structure incorporates a plurality of vertical passages the walls of which have catalyzed surfaces.

The abrasive particles are preferably of such a size with respect to the vertical passages that they will not clog the passageway in any way. With the particles substantially smaller than the passages it will be possible for the particles to move past one another in either direction in any passage so that the device may readily function as a fluidized bed. Thus if the particles are not larger than one-eighth the dimension of the passages, and preferably smaller, the vertical movement of the particles will not be impeded and the particles will not tend to collect in the passages to resist the flow of the exhaust gases.

It should be understood that the invention is not limited to the particular embodiments shown and described herein, but that various changes and modifications may be made without departing from the spirit or scope of this novel concept as defined by the following claims.

Having thus described typical embodiments of my invention, what I claim as new and desire to secure by Letters Patent of the United States is:

1. A catalytic reactor for purifying exhaust gases including:
    a vertically disposed chamber having a bed of abrasive particles in the bottom thereof;
    a first porous screen for supporting the particles;
    a catalytic structure above the particles and mounted in the chamber, said structure having vertical passages defining substantially vertical catalytic surfaces, each of said vertical passages extending from the bottom of said structure to the top thereof and providing for the unimpeded flow of gases therethrough, the abrasive particles being substantially smaller than the passages for movement of the particles vertically in both directions in the passages;
    a second porous screen at the top of said catalytic structure for preventing loss of said particles from said reactor;
    the bottom end of the catalytic structure being spaced above the top surface of the bed of particles to leave a clearance space therebetween; and
    said reactor having an inlet located below said first porous screen and an outlet at the top of the reactor above the top of said second porous screen for passing exhaust gases upwardly through the bed and through the catalytic structure for purifying said exhaust gas and fluidizing said bed such that the particles abrade the catalytic surfaces.

2. A reactor as in claim 1 in which the reactor has a plenum chamber located below the first porous screen with the inlet connecting to said plenum chamber.

3. A catalytic reactor for purifying exhaust gases including:
    a vertically disposed chamber having an outlet at the top and an inlet at the bottom thereof;
    a first porous plate adjacent the bottom of the chamber and above the inlet;
    a catalytic structure mounted in the chamber with the bottom of the structure spaced above the porous plate and having a plurality of vertical passages, each of said vertical passages extending from the bottom of said structure to the top thereof and providing for the unimpeded flow of gases therethrough and having a catalyst coated thereon;
    a bed of abrasive particles supported on said first porous plate, said particles being substantially smaller in dimension that the vertical passages, the bottom of the catalytic structure having a substantial clearance space above the top surface of the bed;
    a second porous plate at the top of said catalytic structure for preventing loss of said particles from said reactor; and
    means for admitting exhaust gases to the inlet of the chamber thereby fluidizing the bed and causing said particles to abrade said catalyst coated walls.

4. A reactor as in claim 3 in which the catalytic structure is a honeycomb monolithic structure.

\* \* \* \* \*